United States Patent [19]

Taylor

[11] 4,208,244
[45] Jun. 17, 1980

[54] ASBESTOS DISPERSIONS

[75] Inventor: Philip H. Taylor, Rochdale, England

[73] Assignee: TBA Industrial Products Limited, Manchester, England

[21] Appl. No.: 861,345

[22] Filed: Dec. 16, 1977

Related U.S. Application Data

[63] Continuation-in-part of Ser. No. 660,431, Feb. 23, 1976, abandoned.

[30] Foreign Application Priority Data

Mar. 8, 1975 [GB] United Kingdom ............... 9751/75

[51] Int. Cl.$^2$ .............................................. C03B 37/00
[52] U.S. Cl. ........................................ 162/3; 162/155; 252/313 R
[58] Field of Search ........................ 162/3, 155, 179; 252/313 R; 264/103

[56] References Cited

U.S. PATENT DOCUMENTS

| | | | |
|---|---|---|---|
| 2,626,213 | 1/1953 | Novak | 162/155 |
| 2,675,745 | 4/1954 | Novak | 162/155 |
| 2,685,825 | 8/1954 | Novak | 162/155 |
| 2,940,892 | 6/1960 | Feigley et al. | 162/155 |
| 3,014,835 | 12/1961 | Feigley et al. | 162/155 |
| 3,297,516 | 1/1967 | Naumann et al. | 162/3 |
| 3,409,499 | 11/1968 | Dresher et al. | 162/3 |
| 3,586,639 | 6/1971 | House | 162/3 |
| 3,630,012 | 12/1971 | Guerther | 162/3 |
| 4,115,991 | 9/1978 | Magnall et al. | 264/103 |

*Primary Examiner*—S. Leon Bashore
*Assistant Examiner*—Peter F. Kratz
*Attorney, Agent, or Firm*—Diller, Ramik & Wight

[57] ABSTRACT

Asbestos fibre is dispersed in an aqueous medium essentially comprised of water, soap and from 25 to a 100 percent molar excess of fatty acid, said excess being calculated on the amount of fatty acid combined in the soap, to form a colloidal dispersion.

8 Claims, No Drawings

ASBESTOS DISPERSIONS

This application is a Continuation-in-Part of my copending application, Ser. No. 660,431, filed 23rd Feb. 1976 now abandoned.

The present invention relates to the production of colloidal aqueous dispersions of chrysotile asbestos fibers and in particular to the production of dispersions for use in the manufacture of coherent bodies such as strands, filaments and textile yarns made therefrom.

Systems containing chrysotile asbestos fibers in aqueous media fall quite clearly into two categories, defined essentially by the state of subdivision of the fibers. Those containing relatively coarse fibers are usually termed "slurries"; those which contain much finer ones "dispersions". For the purpose of this specification we define a dispersion as an aqueous system containing chrysotile asbestos and at least one surface active agent, the state of subdivision of the chrysotile being such that the majority of fibers are of colloidal dimensions, typically less than 1 micron in diameter and the surface active agent being present in sufficient concentration to maintain the system in stable equilibrium for extended periods. The theoretical minimum amount of surface active agent required is equal to the critical micellar concentration of the agent, plus sufficient to give monolayer coverage of the exposed fiber surface, though an excess is normally included to buffer the dispersion against the destabilising effect of polyvalent metal ions, such as magnesium, leached from the fiber.

In practice, such a tight definition is unnecessary, the differences between slurries and dispersions being obvious even to the untrained observer. In slurries, the fibers are usually present in the form of finely flocculated bundles, readily visible to the naked eye, which settle quickly leaving a clear supernatant liquid layer. Slurries drain readily and can be used in sheet and web-forming processes on conventional paper-making machinery. Dispersions, on the other hand, are essentially homogeneous, rarely contain fibers visible to the naked eye, are indefinitely stable without any noticeable settling and, for all practical purposes, cannot be formed into webs by filtration. They are of much higher viscosity than slurries of similar fiber content, and exhibit the opalescent sheen characteristics of fine colloidal systems. In fact, much of the chrysotile asbestos is present in the form of the ultimate fibrils, which have diameters between 20 and 50 millimicrons, well within the colloidal range.

Despite some reports of success using cationic surfactants, all true dispersions are anionic in nature, the surface active agent first reducing and then reversing the natural positive charge on the chrysotile fibers. In slurries, the fibers usually carry their natural positive charge, frequently enhanced by the addition of suitable chemicals to promote further subdivision, though whether colloidal systems are ever achieved is open to doubt. Examples of such treatments are given in U.S. Pat. Nos. 1,907,616, 2,661,288, 3,297,516 and 3,409,499, amongst many. These treatments certainly do enable the chrysotile fibers to be opened to a greater extent than can be achieved in water alone but, since the majority of the reagents are acidic in nature and are quickly neutralised by reaction with the basic surface of the fiber, the benefits are short-lived and the systems cannot be described as stable. In one patent (U.S. Pat. No. 2,940,892) the addition of soap to a fibrous slurry is described. The amounts of soap specified are deliberately insufficient to promote dispersion of the fibers the intention being to reduce the natural positive charge and render the fibers still more flocculant. Despite the similarity between the additives used in this process and those used in the making of dispersions there is no similarity between the respective products, the one being clearly a slurry, the other a true dispersion.

This present invention is entirely concerned with true dispersions and not with slurries. All references to dispersions made herein are therefore clearly directed to systems in which at least the majority of the fibers are of colloidal dimensions, typically less than one micron in diameter.

Asbestos fibers can be dispersed in water with the aid of a surfactant, for example as described in British Patent specification No. 689,692, or with the aid of a mixture of a soap and and anionic surfactant, for example as described in British patent specification No. 1,143,573. This latter specification discloses a process in which a substance capable of reacting with and precipitating the soap is added to such a dispersion in an amount insufficient to cause the dispersion to begin to coagulate but which is in excess of the amount of any such substance forming the natural hardness of the water in the dispersion. One effect of this addition is to improve the quality of the dispersion as regards its homogeneity and smoothness. Suitable additives recited in the specification include various water-soluble salts of, for example, aluminum, zinc or copper, and acids such as sulphuric and hydrochloric acid.

Although dispersions prepared by the techniques discloses in British patent specification No. 1,143,573 are appreciably more homogeneous and contain fibres opened to a greater extent than was previously possible, they are still not ideal for use in strand-or filament-forming processes using fine, easily blocked nozzles, for example those having at least one dimension less than 2 mm, because the incidence of nozzle blockages due to bundles of unopened fibre is unacceptably high for anything other than experimental production. Furthermore, the use of any additive which yields a precipitate of a polyvalent metal soap makes the removal of the residual organic processing chemicals to obtain a substantially pure asbestos yarn more difficult, whether this is carried out by solvent extraction or by the volatilisation of the organic material in a non-oxidising atmosphere, (referred to hereafter as "heat cleansing").

According to the present invention, a dispersion of asbestos fibre in an aqueous medium is essentially comprised of water, soap and from 25 to 100 percent molar excess of free fatty acid. "Excess" in the present context means an amount in excess of that present in, or used to make, the soap. In practice, a 25% molar excess appears to be the minimum necessary with the optimum in the vicinity of a 50% excess. Beyond about 100% excess there is a progressively increasing tendency for the dispersion to become unstable, yielding poor quality strands/filaments.

Other additives are not necessary; in fact the water need not even contain any hardness—imparting salts, as has previously been though essential to the production of dispersions suitable for use in making coherent bodies such as strands/filaments.

The soap may be a commercial product or may be made from a pure fatty acid or a commercially available mixture of fatty acids by reaction with a suitable base. The acid in the soap and the acid forming the excess preferably have a chain length of at least 12 carbon atoms, equivalent to a minimum molecular weight of about 200. It is not necessary for the excess fatty acid to have the same composition as that in the soap.

The base may be an alkali metal hydroxide, for example sodium or potassium hydroxide, or may be ammonia or one of its derivatives such as hydroxylamine, hydrazine and most saturated amines and quaternary ammonium hydroxides; unsaturated amines and their derivatives are, on the whole, unsuitable.

It is important to appreciate that the excess fatty acid required by the present invention does not react with and precipitate the soap as described in British patent specification No. 1,143,573 referred to previously and that, in view of this apparent contradiction of the teaching of the latter specification, the mechanism whereby the present invention operates is not fully understood. The preferred fatty acids are insoluble.

The dispersions of the present invention can be made in at least three different ways. For example, the asbestos fibre may be slurried in water before adding the fatty acid soap, mixing for a period and then adding fatty acid to provide the desired excess, followed by further mixing to thoroughly homogenise the dispersion.

Alternatively, the soap may be prepared in situ by the addition of a stoichiometric amount of fatty acid to a hot solution of a base before adding the fibre and excess fatty acid.

Preferably, however, the fibers are slurried in a hot aqueous solution of the base and the fatty acid is added all at once, followed by mixing thoroughly. Although it offers no obvious technical advantage, this method has the benefit of extreme simplicity.

In order that the invention be better understood, it will now be described with reference to the following six examples. In all but example 6, the dispersion was formed with the aid of a mixer of the kind generally described as a hydrapulper and widely used in the paper making industry for stock preparation.

EXAMPLE 1

The mixer was filled with 300 liters of hot water at about 90° C. and 10 kg of grade 3 fibre added. The mixer was run briefly to slurry the fibre and then 2.5 kg of a commercial sodium soap of mixed tallow fatty acids was added. The soap was 70% active; i.e. it had a water content of 30% by weight. After mixing for 40 minutes, the fibre was largely present as small fibres or bundles which were readily visible to the eye. Stearic acid (90% pure) was then added slowly and the dispersion carefully observed. After about 0.5 kg of acid had been added the dispersion was clearly no longer flocculent but smooth and homogeneous. Mixing was continued for a further 20 minutes and then a thin film of the dispersion was examined between two glass sheets against a diffuse light source. Very few flocs or spelks (coarse fibre bundles) could be seen with the naked eye. The fatty acid molar excess was in this example about 30%.

EXAMPLE 2

Using the same mixer, 336 g of sodium hydroxide was dissolved in 300 liters of water at about 70° C. and 2.37 kg of oleic acid added. After a few minutes agitation the latter dissolved to form a soapy solution to which 15 kg of grade 3 asbestos was added. The mixer was then run for 1 hour, after which the fibre was present in the same finely flocculated form observed in Example 1. Then 1 kg of oleic acid was added (with the mixer still running) and the dispersion was rapidly transformed to a smooth, homogeneous consistency. It was rather more viscous than that discribed in the previous Example because of its greater fibre content but otherwise it was very similar when examined between two glass sheets. The fatty acid molar excess in this case was about 42%.

EXAMPLE 3

Again using the same mixer, 600 ml of 14 molar ammonia solution was added to 300 liters of water at about 65° C. 15 kg of grade 3 asbestos fibre was added and the mixer run to slurry the fibre before adding 3 kg of myristic acid and running the mixer for 75 minutes. The dispersion was then examined between two glass sheets, as in Example 1, and its quality was extremely good. It will be appreciated that in this, and all subsequent Examples the soap was not only formed in situ but the excess fatty acid was introduced at the same time. The fatty acid molar excess in this case was of the order of 57%.

EXAMPLE 4

The procedure of Example 3 was repeated using 1.25 kg of triethanolamine instead of the ammonia. The dispersion produced was once again of high quality. The fatty acid molar excess was again of the order of 57%.

EXAMPLE 5

Example 3 was repeated with 480 g of potassium hydroxide instead of the ammonia and 3.75 kg of stearic acid instead of the myristic acid. The dispersion was smooth, homogenous and of good quality. The fatty acid molar excess was in this case about 54%.

EXAMPLE 6

A tank fitted with a pump arranged to re-circulate the contents was filled with 540 liters of water at about 70° C., to which was added 405 of sodium hydroxide and 18 kg of grade 3 asbestos fibre. After pumping the mixture around for a while to slurry the fibre, 2.75 kg of lauric acid was added and pumping continued for 3 hours, yielding a smooth, homogenous dispersion. The fatty acid molar in this case was of the order of 36%.

The range of dispersions possible using the method of the invention appears to be very wide. The asbestos fibre content may be in the range from about 0.5 to about 10% by weight; preferably it is from about 1.5 to about 7.5%. Above 10% it becomes increasingly difficult to mix effectively.

The possible permutations of bases and fatty acids are numerous and the exact amount of excess fatty acid does not appear to be critical, quite unlike, for example, the technique disclosed in specification No. 1,143,573. In any particular instance the amount of excess acid needed can, with experience, be assessed quite easily by eye, because the quality of the dispersion improves markedly as the acid is added, although naturally the effect becomes progressively less noticeable after the initial acid additions. The optimum excess for a given dispersion is also related to the characteristics of the fibres used.

Although it is possible to make, store and/or use dispersions at ambient temperature where the fibre content is very low, it is important to appreciate that the dispersions should preferably be kept at above their gel point, the latter being a matter for experiment in any given case as it is a function of the materials/quantities employed.

Dispersions made according to the invention are useful in yarn/strand/filament-making processes. All can be solidified by coagulation with polyvalent metal salts as described in British patent specifications Nos. 824,446 and 1,129,815 though the benefits which are obtained by omitting such salts from the dispersion, outlined previously, are lost thereby and, in some cases, the strands are of marginal strength. Dispersions made according to the invention which gel at room temperature are very suitable for use in the strand-forming process disclosed in co-pending patent application Ser. No. 660,495 filed Feb. 23rd, 1976 and now U.S. Pat. No. 4,115,991.

We claim:

1. A dispersion of asbestos fiber in an aqueous medium consisting essentially of water, soap and from 25 to 100 percent molar excess of free fatty acid, said excess being calculated on the amount of fatty acid combined in the soap, said fatty acid having a chain length of at least 12 carbon atoms.

2. A dispersion according to claim 1 wherein the soap is the reaction product of a fatty acid with an alkali metal hydroxide base.

3. A dispersion according to claim 1 wherein the soap is the reaction product of a fatty acid with ammonia.

4. In the process of making a dispersion of asbestos fibre suitable for passage through a nozzle in order to form a strand or filament, which process comprises opening asbestos fibre, in an aqueous medium containing a sufficient amount of fatty acid soap as to effect a dispersion of the asbestos fibers in the aqueous medium, by mixing such aqueous medium containing the asbestos fibre for a time sufficient to provide the dispersion, the improvement which comprises effecting said mixing, for a time at least sufficient to produce a smooth and homogeneous dispersion, in the presence in said mixture of from 25 to 100 percent molar excess of a free fatty acid having a chain length of at least 12 carbon atoms and which does not react with or precipitate said soap.

5. A dispersion of asbestos fibre in an aqueous medium characterized by its smoothness and homogeneity and its ability to pass through a nozzle in order to form a strand or filament, which aqueous medium consists essentially of water, a fatty acid soap in amount sufficient to effect a dispersion of the asbestos fibres in the aqueous medium and from 25 to 100 percent molar excess of a free fatty acid having a chain length of at least 12 carbon atoms and which does not react with or precipitate said soap.

6. The method of making a smooth and homogeneous dispersion of asbestos fiber in water for the production of coherent bodies such as strands and filaments, which comprises the steps of:
   (a) providing a fatty acid soap in which the fatty acid has a chain length of at least 12 carbon atoms;
   (b) providing free fatty acid having a chain length of at least 12 carbon atoms and which does not react with or precipitate the soap of step (a); and
   (c) dispersing an amount of asbestos fiber of from about 0.5 to about 10% by weight in water in the presence of (i) a sufficient amount of the soap of step (a) to form a dispersion of the asbestos fiber and (ii) a weight amount of the free fatty acid of step (b) which is equal to from 25 to 100 percent the weight amount of the fatty acid content of the soap of step (a).

7. The method of claim 6 wherein the fatty acid soap of step (a) and the free fatty acid of step (b) are provided by reacting a free fatty acid having a chain length of at least 12 carbon atoms with an alkali metal hydroxide base in such relative weight amounts as to provide the excess fatty acid specified in step (c).

8. The method of claim 6 wherein the fatty acid soap of step (a) and the free fatty acid of step (b) are provided by reacting a free fatty acid having a chain length of at least 12 carbon atoms with ammonia in such relative weight amounts as to provide the excess fatty acid specified in step (c).

* * * * *